Nov. 16, 1948.　　　　S. N. WEKEMAN　　　　2,454,240
PHOTOGRAPHIC SUCTION HOLDER
Filed March 1, 1946　　　　　　　　　　　　5 Sheets-Sheet 1
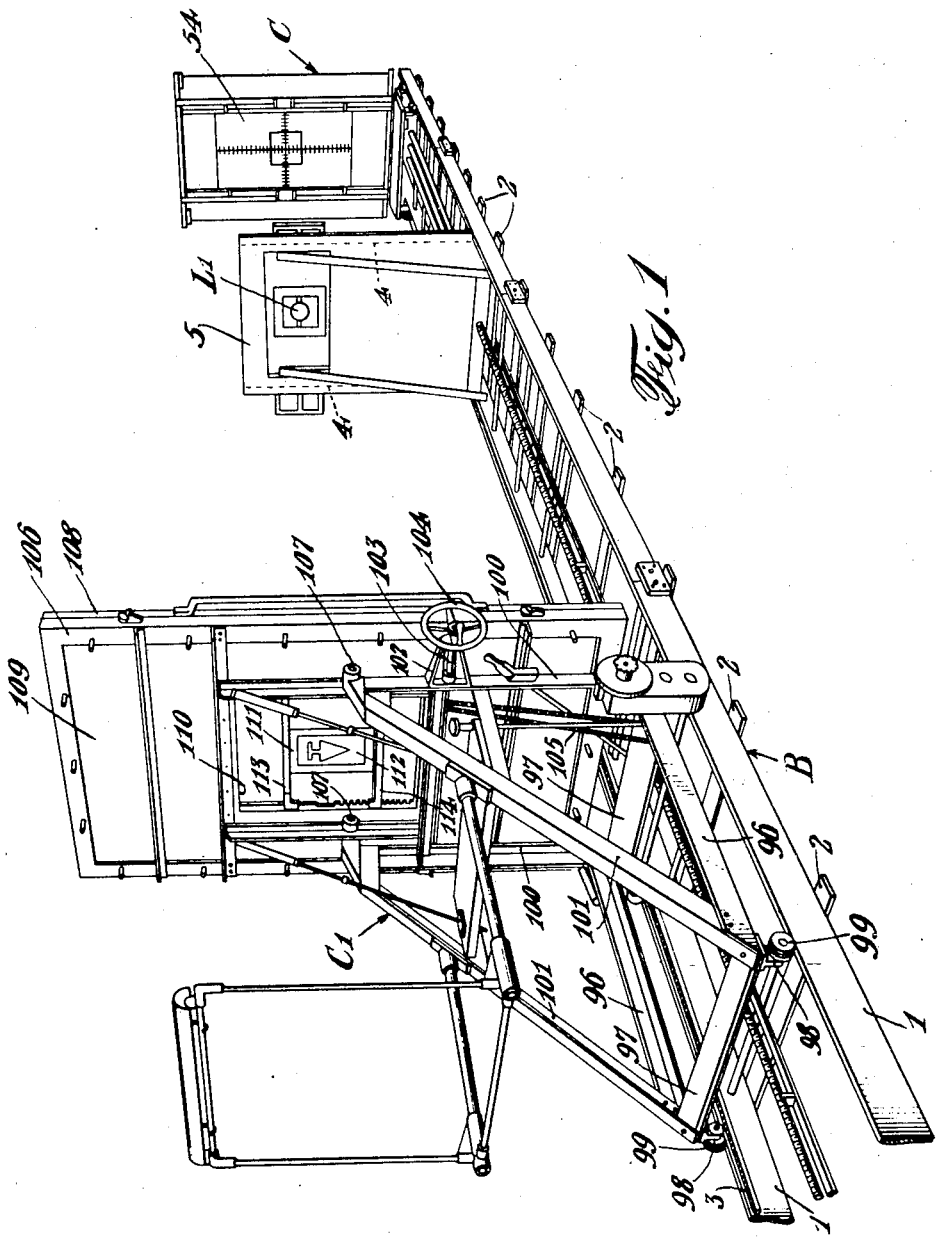
INVENTOR
*Stephen N. Wekeman*
BY
*Ward Crosby & Neal*
ATTORNEYS Nov. 16, 1948. S. N. WEKEMAN 2,454,240
PHOTOGRAPHIC SUCTION HOLDER
Filed March 1, 1946 5 Sheets-Sheet 2
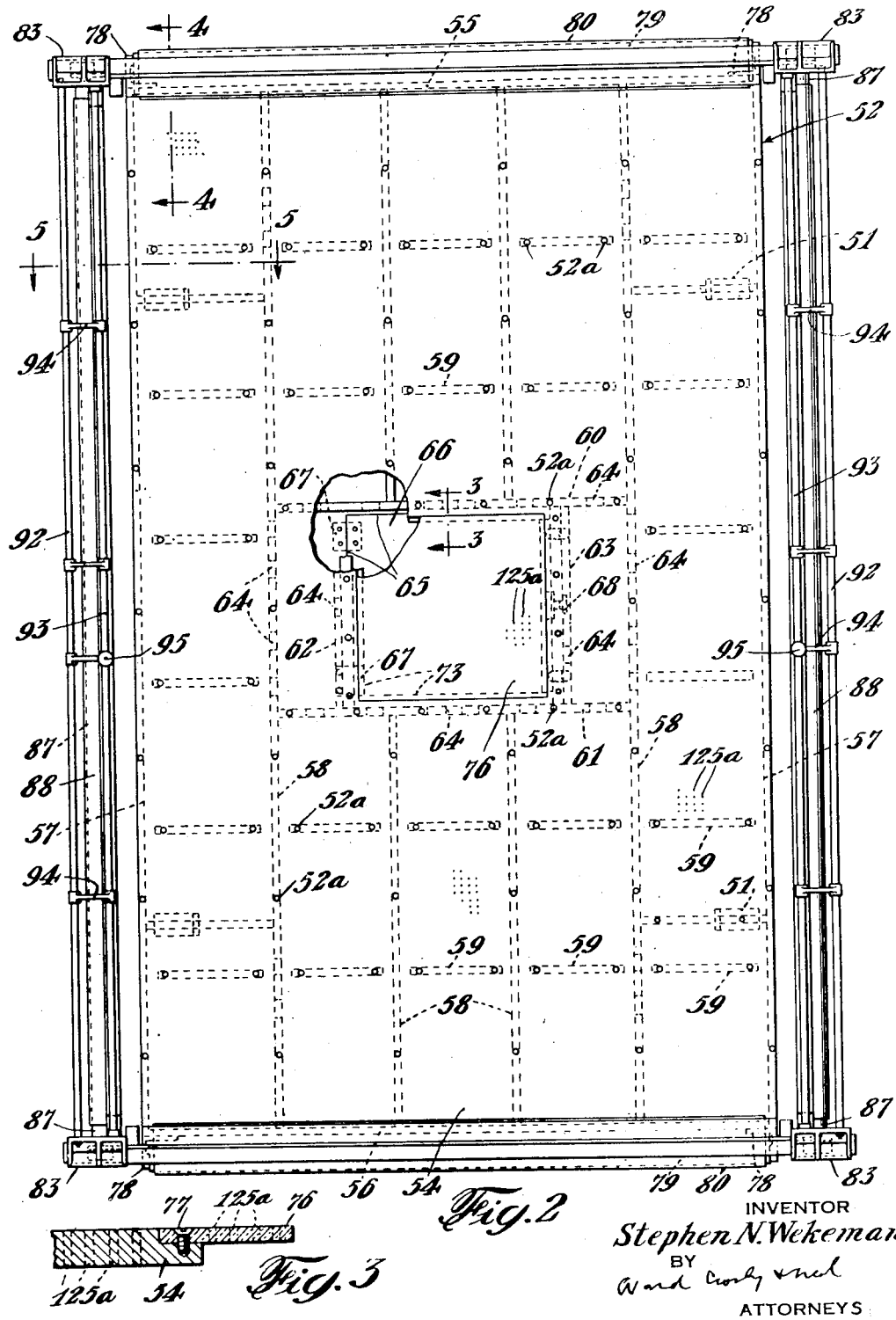
INVENTOR
Stephen N. Wekeman
BY
ATTORNEYS

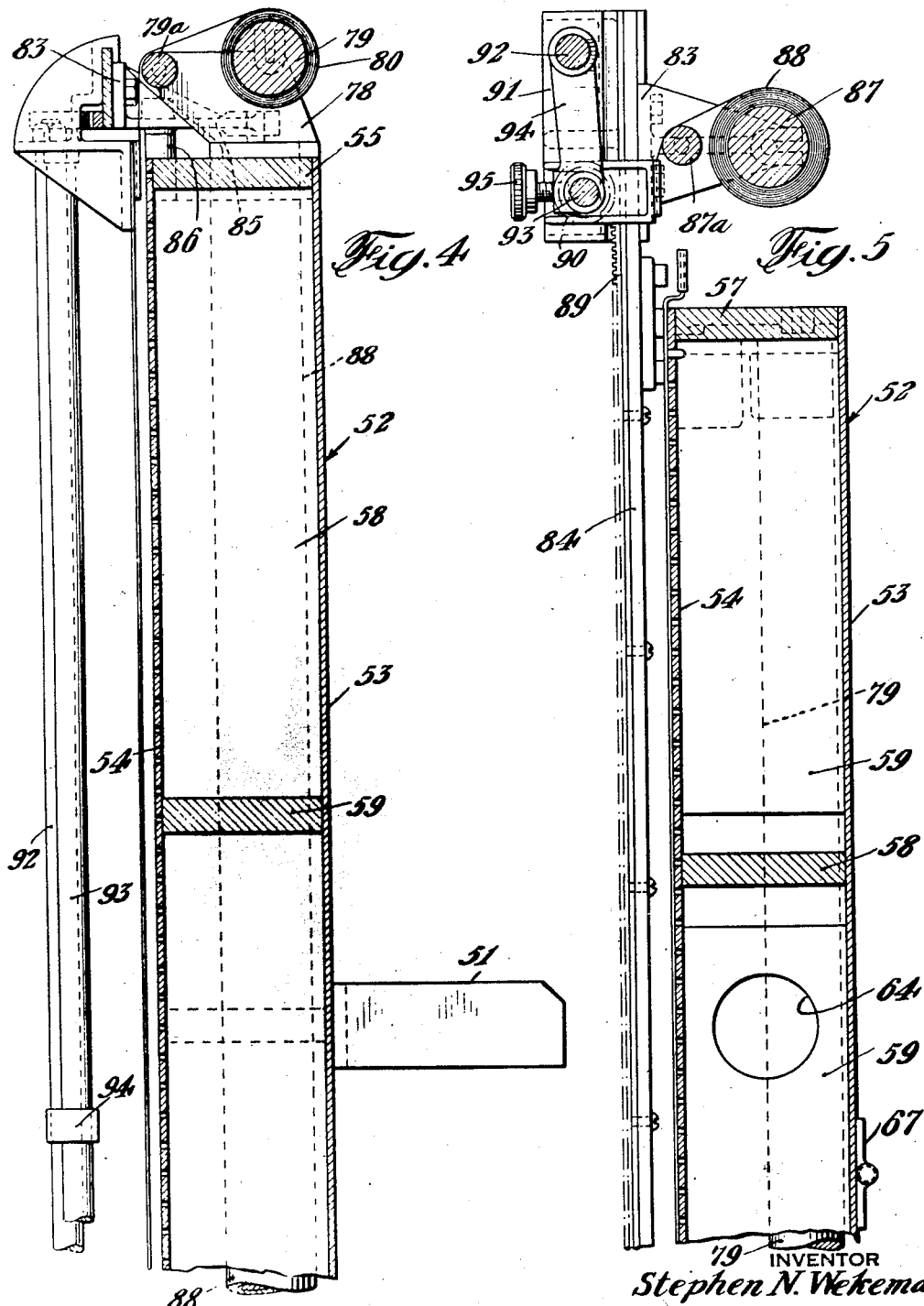

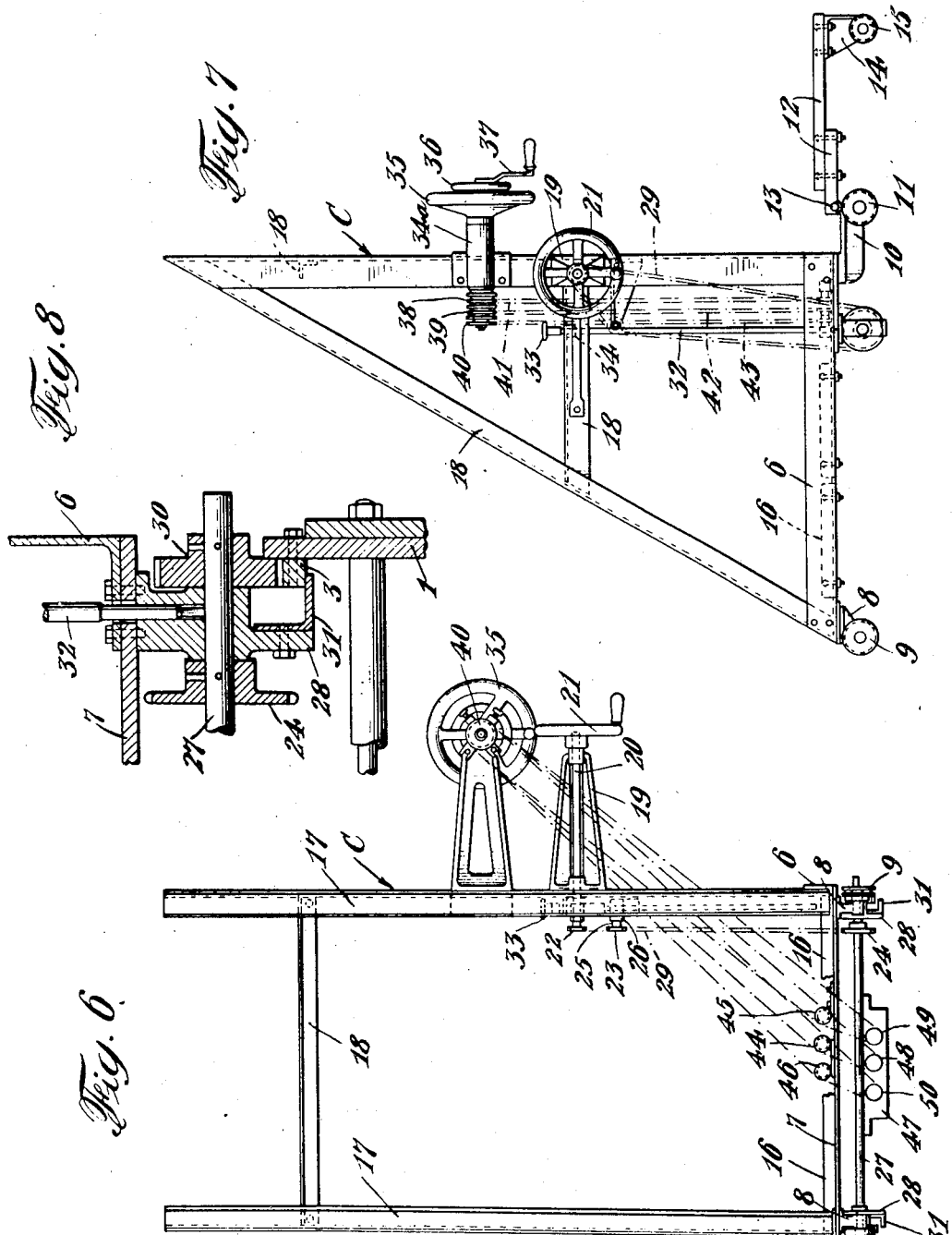

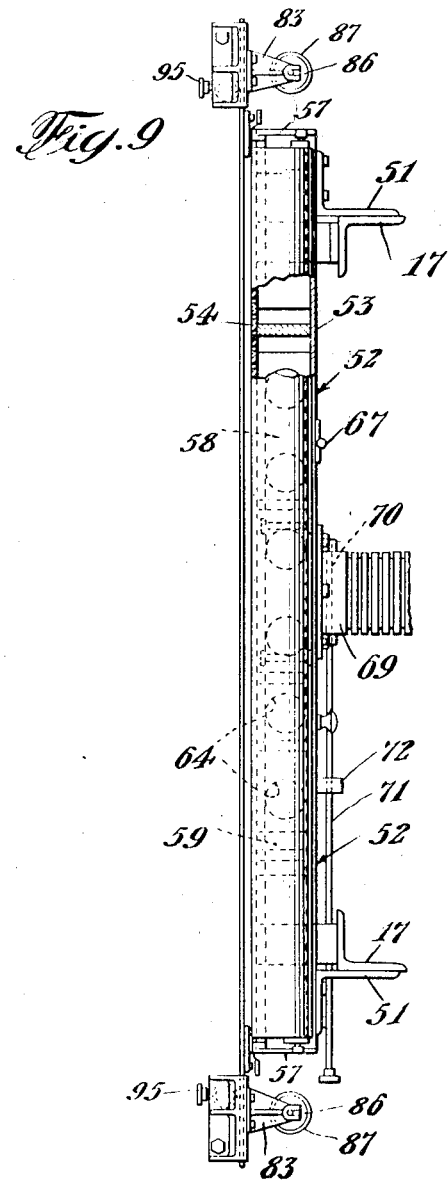

Patented Nov. 16, 1948

2,454,240

UNITED STATES PATENT OFFICE 2,454,240

PHOTOGRAPHIC SUCTION HOLDER

Stephen N. Wekeman, Saddle River Township, Bergen County, N. J., assignor to Sun Chemical Corporation, New York, N. Y., a corporation of Delaware Original application April 29, 1943, Serial No. 485,004. Divided and this application March 1, 1946, Serial No. 651,213

3 Claims. (Cl. 88—24)

My invention relates to suction housings such as photographic suction holders for holding sensitized surfaces to be exposed.

In accordance with my invention, that wall of the suction housing facing the camera objective lens, in part at least, is formed from a translucent focusing member and, ordinarily, the suction housing comprises a rear door which may be opened to permit observation of said focusing member.

Various other objects, advantages and features of my invention will become apparent from the following detailed description.

My invention resides in the suction housing, arrangements and combinations of the character hereinafter described and claimed.

This application is a division of application Serial No. 485,004, filed April 29, 1943, now Patent No. 2,420,023, granted May 6, 1947, for Changeable lens and filter structure for copy cameras.

For an understanding of my invention and for an illustration of one of the forms thereof, reference is to be had to the accompanying drawings, in which:

Figure 1 is a perspective view showing a camera having incorporated therein the suction housing of my invention;

Fig. 2 is an enlarged elevational view showing the front of the suction housing;

Fig. 3 is a detailed sectional view taken on the line 3—3 of Fig. 2 looking in the direction of the arrows;

Fig. 4 is an enlarged, vertical sectional view taken on the line 4—4 of Fig. 2 looking in the direction of the arrows;

Fig. 5 is an enlarged, horizontal sectional view taken on the line 5—5 of Fig. 2 looking in the direction of the arrows;

Fig. 6 is a rear elevational view of the suction housing carriage;

Fig. 7 is a side elevational view of the carriage shown in Fig. 6;

Fig. 8 is an enlarged vertical sectional view, partly in elevation, showing the drive mechanism for the carriage illustrated in Figs. 6 and 7; and Fig. 9 is a plan view of my novel suction housing.

Referring to Figure 1, I have shown a base B which comprises a pair of parallel tracks 1, 1 supported by cross ties 2 adapted to be supported by a floor or other suitable surface. Each of the tracks 1, 1 has secured thereto a horizontal rack 3. The respective tracks 1, 1 have suitably secured thereto a pair of vertical standards 4 which, in the manner described in my aforesaid application, support an objective lens L1 in projecting position. A plate 5, apertured for the passage of the projecting light beam, is secured to the standards 4 and forms a part of the camera dark room structure.

Referring to Figs. 6, 7 and 8, the aforesaid tracks 1, 1 are shown as supporting a frame formed from longitudinally extending members 6 disposed in parallel relation and transverse members 7 likewise disposed in parallel relation, these members 6 and 7 being suitably secured to each other in frame-forming relation so as to form a movable base for a carriage C utilizable as hereinafter described. The rear member 7, at each end thereof, has secured thereto in suitable manner a bearing structure 8, these bearing structures 8 being alined transversely and each of them supporting a horizontal stud on which a roller 9 is freely rotatable. The front member 7, at each end thereof, has secured thereto in suitable manner a bearing structure 10, these bearing structures 10 being transversely alined and each of them supporting a horizontal stud on which a roller 11 is freely rotatable.

Disposed in front of the carriage C is a platform formed, in the example shown, from a pair of transversely extending members 12 suitably bolted together, one end of this platform being supported by the bearing structure 10 preferably in pivotal fashion as indicated at 13. Secured to each front corner of the aforesaid platform is a bearing structure 14, these bearing structures 14 being transversely alined and each of them supporting a horizontal stud on which a roller 15 is freely rotatable.

In view of the foregoing description, it will be understood that one set of rollers 9, 10 and 15 engage one of the tracks 1 whereas the other set of rollers 9, 10 and 15 engage the other track 1. As indicated in Fig. 6, the set of rollers at the left engage the adjacent track 1 in non-grooved relation whereas the set of rollers at the right are grooved for the reception of the adjacent track 12.

Preferably, in accordance with the invention, the longitudinally extending members 6 have bolted or otherwise secured thereto one or more transversely extending platform-forming members 16.

Upstanding from and secured to the aforesaid movable base for the carriage C are a pair of vertical members or standards 17, such as angle irons, these standards 17 being braced by the inclined and horizontal members 18.

As shown in Figs. 6 and 7, one of the aforesaid standards 17 carries a horizontally extending bracket 19 in which is journaled a shaft 20 having an operating hand wheel 21 at one end thereof. Suitably secured to the other end of the shaft 20 is a sprocket wheel 22 disposed in the same vertical plane as an idler sprocket wheel 23 and a driven sprocket wheel 24. The sprocket wheel 23 is journaled on a stub shaft 25 carried by a bracket 26 secured to the adjacent standard 17. The sprocket wheel 24 is secured to a horizontal shaft 27 journaled in bearing brackets 28 secured to and depending from that transverse member 7 which is disposed at the front of the movable base for the carriage C. Carried by the sprocket wheels 22, 23 and 24 is an endless sprocket chain 29 serving to transmit power generated at the hand wheel 21 to the driven sprocket wheel 24.

Adjacent each of its ends, the shaft 27 has secured thereto a gear wheel 30, these gear wheels being disposed immediately above and in meshing relation with the respective racks 3. As shown in Fig. 8, it is desirable for each of the bearing brackets 24 to have an angle member 31 secured thereto in suitable manner, these angle members 31 engaging the bottom surfaces of the respective racks 3 to thereby maintain the gear wheels 30 in proper meshing relation with the respective racks 3.

As shown in Fig. 8, the bearing bracket 28 toward the right, Fig. 6, is provided with a vertical passage extending upwardly from the shaft 27 for the reception of the reduced lower end of a rod 32 which extends vertically to approximately the height of the hand wheel 21 and there terminates in an actuating wheel 33, the rod 32 being threaded in suitable manner to some fixed part of the mechanism, for example, to a nut 34 carried by the adjacent horizontal bracing member 18.

With the rod 32 elevated to such extent that the lower end thereof is above the shaft 27, it will be understood that an operator may rotate the hand wheel 21 to thereby transmit rotary movement to the sprocket wheel 24, through the mechanical connection comprising the shaft 20, the sprocket wheel 22 and the sprocket chain 29. As a result, rotatable movement of the shaft 27 and gear wheels 30 is produced. The gear wheels mesh with the respective racks 3 and, therefore, responsive to movement of said hand wheel 21, the carriage C is moved in one direction or another along the tracks 1, 1. In case it becomes desirable to positively retain the carriage C in any selected position to which it has been moved, the rod 32 may be rotated to move the reduced end thereof into locking engagement with the shaft 27 and thereby prevent translatory movement of the carriage C.

Referring to Figs. 6 and 7, one standard 17 is shown as carrying a bracket 34a which supports outer and inner sleeves together with an inner shaft, not shown. Operatively associated therewith, at one end thereof, are the respective actuating wheels or members 35, 36 and 37. At their other ends, the aforesaid sleeves and shaft carry the respective sprocket wheels 38, 39 and 40 with which are associated the respective endless sprocket chains 41, 42 and 43 which engage idler sprocket wheels 44, 45 and 46, respectively, the latter being mounted on the upper surface of one of the hereinbefore described members 7. Secured to the lower surface of said member 7 is a bracket 47 serving to rotatably support sprocket wheels 48, 49 and 50 with which the aforesaid sprocket chains 41, 42 and 43 coact, respectively. As fully disclosed in my aforesaid application, rotation of the wheel 35 causes movement of the carriage C1 along the tracks 1. Rotation of the wheel 36 causes horizontal movement of the objective lens L1 whereas rotation of the member 37 causes vertical movement of said objective lens.

Referring to Fig. 9, each of the hereinbefore described standards 17 of the carriage C is shown as having secured thereto a plurality of angle members 51, Fig. 2, which are secured in suitable manner to a suction housing 52 comprising rear and front walls 53 and 54, top and bottom walls 55 and 56 together with side walls 57, the aforesaid angle members 51 being secured to said rear wall 53.

The suction housing 52 is braced by a plurality of spaced vertical members 58 and a plurality of spaced horizontal members 59, the outermost members 59, Fig. 2, terminating short of the respective housing side walls 57 and the respective members 58 closest thereto, the inner members 59 terminating short of the respective members 58.

As shown in Fig. 2, the two central members 58 terminate equal distances above and below the central horizontal plane of the housing 52. Horizontal upper and lower members 60 and 61 are disposed flushly against the respective upper and lower sections of the two central members 58, the members 60 and 61 extending beyond the two central members 58 and engaging those members 58 which are disposed at the opposite, respective sides of said central members 58. As also shown in Fig. 2, the upper and lower members 60 and 61 are braced by vertical members 62 and 63 disposed, respectively, at equal distances from the central vertical plane of the housing 52.

It will be understood that the members 58, 59, 60, 61, 62 and 63 are suitably secured, as by screws 52a, in right-angular relation to the rear and front housing walls 53, 54 and that they span the space defined thereby. As indicated in Figs. 2 and 9, the members 60, 61, 62 and 63 are provided with openings 64. Further, as regards those vertical members 58 which engage the members 60 and 61, the sections thereof between said members 60 and 61 are provided with similar openings 64, all of these openings 64 being utilizable as hereafter described.

Referring to Figs. 2 and 9, the rear housing wall 53 is shown as comprising an aperture 65 which receives a door 66 hinged to said wall 53 at 67 and 67, the door 66 being maintained in the plane of the wall 53 by suitable latch mechanism 68, Fig. 2. Suitably secured to the door 66 is the flanged end of a nozzle 69 to which is connected a hose leading to any suitable vacuum pump, not shown. Disposed interiorly of the nozzle 69 is a damper or control valve 70 having an operating shank to which is operatively related, in detachable manner, a rod 71 slidable in a bearing 72 secured to the rear housing wall 53.

In accordance with the invention, the front housing wall 54 is shown as comprising an aperture 73 corresponding generally and alined with the aforesaid aperture 65 of the rear housing wall 53. Seated in a flanged surface of the wall 54 is a member 76 on which images may be focused. The member 76 may be a sheet of ground glass although, preferably, it is a sheet of transparent and colorless synthetic resin. As herein shown, the peripheral portion of the member 76 is provided with a plurality of spaced apertures through which extend the respective screws 77 utilizable for holding said member 76 in the plane of the wall 54.

As indicated in Fig. 2, the front wall 54 of the suction housing 52 together with the member 76 are provided with closely spaced apertures 125a which open from the atmosphere into the interior of said housing 52.

Referring to Figs. 2 and 4, the aforesaid top wall 55 of the housing 52, at each end thereof, has the horizontal arm of a T-member 78 secured thereto in suitable manner. The vertical arm of each angular member 78 is provided with an upwardly-opening vertical slot and these slots are alined horizontally for the reception, respectively, of a locked pin and a rotating pin which extend axially from opposite respective ends of a horizontal roller 79 upon which is wound a horizontal curtain 80 adapted to engage an idler roller 79a, this pin and roller arrangement together with the supports therefor corresponding generally with the usual window shade construction of similar nature.

As indicated in Fig. 2, the bottom wall 56 of the housing 52 carries a pin arrangement, horizontal roller and horizontal curtain arrangement of the character described above. To parts of the lower curtain arrangement which correspond with the respective parts of the upper curtain arrangement, duplicate reference characters have been applied, respectively.

Referring to Figs. 2 and 5, each side wall 57, at the upper and lower ends thereof, has a T-member 83 secured thereto, these T-members being vertically and horizontally alined in pairs and each pair of said T-members 83 having a horizontal track 84 secured thereto in suitable manner. As shown in Fig. 4, the T-member 83 comprises a horizontal arm 85 which carries a vertical stud 86 engaged, at its lower section, with the top wall 55. As indicated in Figs. 4 and 5, the end of the arm 85 terminates in a bearing support.

It will be understood that a T-member 83 is disposed and mounted as described above at each corner of the suction housing 52. The arms 85 are alined in vertical pairs adjacent each side wall 57 and each pair of vertically alined arms 85 supports the respective ends of a vertical roller 87 having a vertical curtain 88 wound thereon, the roller and curtain arrangement corresponding generally with that hereinbefore described with reference to the rollers 79 and 80.

In view of the foregoing description, it will be understood that horizontal tracks 84 are disposed at and along the respective upper and lower ends of the suction housing 52. Each of these tracks carries a rack bar 89 with which meshes a pinion 90 mounted in the manner hereinafter described. Coactable with each of the tracks 84 is a pair of slides 91 and these are alined vertically in pairs. As shown particularly in Fig. 2, each pair of the vertically alined slides 91 is connected together by a vertical rod 92 and a vertical shaft 93, the upper and lower pinions 90 of each set of pinions being secured to the respective shafts 93.

As shown in Figs. 4 and 5, each of the rods 92 has a plurality of straps 94 secured thereto. At each side of the housing 52, each set of straps 94 projects toward and forms bearings for the adjacent shaft 93. For each shaft 93, one of the straps 94 is threaded for the reception of a headed screw 95 which may be moved into engagement with or released from the adjacent shaft 93 for a purpose hereinafter to be described.

Each of the vertical curtains 88 hereinbefore described passes over an idler roller 87a, Fig. 5, and each curtain 88 is suitably attached, at the respective corners thereof, to the adjacent upper and lower slides 91.

Referring to Fig. 1, the aforesaid tracks 1, 1 are shown as supporting a frame formed from longitudinally extending members 96 disposed in parallel relation and transverse members 97 likewise disposed in parallel relation, these members 96 and 97 being suitably secured to each other in frame-forming relation so as to form a movable base for a carriage C1 utilizable as hereinafter described. Secured to each corner of the frame formed by the aforesaid longitudinal and transverse members 96 and 97 is a bearing structure 98, these bearing structures being alined longitudinally and transversely in pairs. Each bearing structure 98 supports an outwardly extending horizontal stud and each stud freely supports a roller 99.

Upstanding from and secured to the aforesaid base for the carriage C1 are a pair of vertical member or standards 100, such as angle irons, these standards being braced by the inclined members 101. One of the standards 100 carries a horizontal bracket 102 in which is journaled a shaft 103 having an operating hand wheel 104 at one end thereof. Suitably secured to the other end of the shaft 103 is a sprocket wheel, not shown, operative to drive an endless sprocket chain 105 through which, by suitable mechanism, not shown, power is transmitted to the carriage C1 to move it in one direction or the other along the tracks 1, 1.

As fully disclosed in my aforesaid application Serial No. 485,004, filed April 29, 1943, an open frame 106 of oblong rectangular configuration is pivoted at 107, Fig. 1, for swinging movement about a horizontal axis. Coactable with the open frame 106 is a similar open frame 108 which supports a transparent plate, not shown, in fixed position. The frame 106 supports a plate 109 which is suitably biased toward the aforesaid transparent plate. The plate 109 comprises an aperture 110 and, in this aperture, a frame 111 carrying a transparent or translucent representation-bearing member 112 such, for example, as a positive copy, Fig. 1, is supported by upper and lower supporting bars 113 and 114 which are suitably supported as described in my aforesaid application.

In accordance with usual practice, a camera dark room is provided, one wall thereof being apertured to receive a frame, not shown, in which the upper edge of the plate 5, Fig. 1, is received preferably in non-contacting relation so as to avoid the transmission of vibrations thereto. As will be understood, the hereinbefore described suction housing 52 and parts associated therewith are housed in this camera dark room.

During operation of the hereinbefore described vacuum pump, air is continuously exhausted from the suction housing 52. In so doing, the air passes around the horizontal members 59 and through the openings 64 formed in the members 58, 60, 61, 62 and 63, the air finally reaching the chamber bounded by the members 60, 61, 62 and 63 from which such air is exhausted through the described hose connection.

After the light-sensitive member which is to be associated with the front wall 54 of the suction housing 52 has been selected and, knowing the dimensions thereof, the operator observes horizontal and vertical scales, Fig. 1, which are formed on the front housing wall 54 to thereby determine the extent to which the curtains 80 and 88 are to be opened. When opening the horizontal curtains 80, they are drawn toward each other to the desired extent. As shown in Figs. 4 and 5, each corner of each horizontal curtain carries a pin and, after each horizontal curtain has been properly positioned, these pins are passed into openings formed in the opposite vertical sides of the housing wall 53, these openings being spaced close to each other for the intended purpose. In this manner, said longitudinal curtains 80 are caused to remain in their intended positions.

Thereupon, each assembly comprising a pair of vertically alined slides 91, a vertical rod 92 and a vertical shaft 93 is moved toward the central vertical plane of the housing 52 to a desired extent whereby each of the vertical curtains 88 is unwound to the amount desired. This movement of the slides 91 occurs along the respective tracks 84. During such slide movement, the pinions 90 at the respective ends of each shaft 93 rotate, in meshing relation, with the respective rack bars 89 and, as will be understood, an arrangement of this character positively causes the two slides 91 of each assembly to remain in vertical alinement. After completion of the operation last described, each of the screws 95 may be threaded into engagement with its cooperating shaft 93 to thereby positively retain each vertical curtain 88 in the position to which adjusted.

After completion of the operation described above, there remains an exposed area of the front housing wall 54 having dimensions corresponding with the dimensions of the selected light-sensitive member. All other parts of said wall 54 are covered by the described curtains.

With the vacuum pump operating and with the curtains 80 and 88 together with the described light-sensitive member covering the entire area of the housing wall 54, it results that all of the apertures 125a thereof are sealed either by the curtains or by said light-sensitive member. As a result, said light-sensitive member is effectively held in position on the wall 54 by action of suction.

The hereinbefore described platform which is formed by the members 12 is provided so that the operator may stand thereon during the above described operations involving movement of the curtains 80 and 88 to their adjusted positions and disposition of the light-sensitive member in its selected position.

When the vacuum pump was operated as described above to exhaust air from the suction housing 52, the rod 71, Fig. 9, was in such position that the damper 70 is in its non-obstructing position. The rod 71 may be rotated to thereby move the damper 70 to a position wherein it closes the passage in the nozzle 69 and, at this time, even though operation of the vacuum pump continues, there is no suction effect in the housing 52. The provision of the damper 70, then, is advantageous because providing means for temporarily discontinuing the suction effect in the housing 52 even though operation of the vacuum pump continues.

After completion of the foregoing, the focusing operation should be proceeded with. While this operation proceeds, the above described light-sensitive member should not be attached to the housing 52. In lieu thereof, for focusing purposes, a sheet of white paper should be suitably attached to said suction housing 52 in the space which, subsequently, is to be occupied by the light-sensitive member. At this time, in suitable manner, a light beam is passed through the representation-bearing member 112, thence through the objective lens L1 and into engagement with the aforesaid sheet of paper.

Thereupon, as fully disclosed in my aforesaid application, the operator in the dark room rotates the hand wheels 21 and 36, Figs. 6 and 7, to thereby move the respective carriages C and C1 with respect to each other and with respect to the objective lens L1 until the image projected on the focusing paper sheet, as viewed by the dark room operator standing in front thereof, is properly focused and has the desired dimensions. After completion of the operations described above, the operator in the dark room centralizes the image on the aforesaid white paper sheet by suitably rotating the hand wheel 36 and the member 37, Figs. 6 and 7, whereby the objective lens L1 is moved horizontally and vertically to the necessary extent.

A feature of distinct importance in connection with the present invention involves the suction housing arrangement comprising the door 66 and focusing member 76. It was explained above that the operator in the dark room stands in front of the carriage C in order to observe the image projected on the focusing paper sheet. Alternatively, without using said focusing paper sheet, the rod 71, Fig. 9, may be moved to its retracted position whereupon the latch mechanism 68 may be actuated to open the door 66. After this has been done, the operator in the dark room stands upon the rear platform formed by the members 16, Fig. 7, so as to directly observe the focusing member 76 from the rear in order to ascertain the character of the image projected thereon.

The invention has hereinbefore been described in connection with projection of that type wherein the light beam passes through the representation-bearing member. Alternatively, reflecting projection may be employed as particularly described in my aforesaid application.

After completion of the operations described above, the camera is in condition for the photographing operation. With the vacuum pump operating, the dark room operator removes the above described focusing paper sheet, if utilized, from the lens housing 52 and places the light-sensitive member in this space. While the copy in the frame 111 remains illuminated, the exposure of the light-sensitive member is effected in the usual manner as will be understood by those skilled in the art.

Although the curtain-masking arrangement and the arrangement comprising the focusing member 76 and the door 66 have been illustrated and described as forming part of a suction housing which is included in a camera, it shall be understood that the invention is not to be thus limited. Obviously, these arrangements may be used in projection arrangements other than cameras.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a device of the character described, a suction housing and an abjective lens spaced therefrom, the front wall of said suction housing comprising a centrally disposed translucent focusing plate disposed in and at right angles to the optical axis of said objective lens, said front wall and said plate being provided with apertures placing the interior of said housing in communication with the atmosphere, the rear wall of said suction housing comprising a movable door centrally disposed which may be opened when it becomes desirable to view said focusing plate, and a suction hose having one end secured to said door and in communication with the interior of said housing.

2. In a device of the character described, a suction housing comprising spaced apart front and rear walls, one of said walls being provided with a translucent plate and a surrounding wall portion of substantially greater area than the area of said plate, said plate and surrounding wall portion being provided with apertures placing the interior of said housing in communication with the atmosphere, the other of said walls being provided with an opening opposite said plate, a panel for said opening selectively movable to open and closed positions, a suction conduit secured to said panel and in communication with the interior of said housing, and a valve for closing said conduit.

3. A suction holder of the character described comprising a housing having front and rear walls, a central panel of said front wall being translucent, said translucent panel and the surrounding area of said front wall being provided with a plurality of spaced apertures, said rear wall being provided with a panel disposed opposite said translucent front wall panel and selectively movable to open and closed positions, said movable panel carrying secured thereto a suction nozzle attached to a flexible suction conduit, whereby suction is imposed at a central zone of said housing, a damper for closing said nozzle to thereby shut off suction through said nozzle when said rear wall panel is moved to open position, and a manually engageable operating member for actuating said valve, said engageable member being movably mounted on said housing and being detachable from said valve.

STEPHEN N. WEKEMAN.

REFERENCES CITED

The following references are of record in the file of this patent:

UNITED STATES PATENTS

| Number | Name | Date |
|---|---|---|
| 1,813,689 | Weisker | July 7, 1931 |
| 1,813,690 | Weisker | July 7, 1931 |